Aug. 25, 1959 J. L. RUSSELL 2,901,571

SYNCHRONOUS INVERTER

Filed May 22, 1958 2 Sheets-Sheet 1

2,901,571

SYNCHRONOUS INVERTER

John L. Russell, Waterbury, Conn., assignor to The Bristol Company, Waterbury, Conn., a corporation of Connecticut Application May 22, 1958, Serial No. 737,037

12 Claims. (Cl. 200—90)

This invention relates to an electrical device, and more particularly to such devices which are especially well suited for use in apparatus intended to provide precise measurement or control.

A typical problem concomitant to the sealing, shielding or isolation of electrical equipment of the class under consideration as used in precision measurement or control apparatus arises, for example, in connection with the use of synchronous vibrators, or inverters, for conversion of small, unidirectional voltages into interrupted or alternating voltages adaptable to amplification by conventional A.-C. amplifier techniques. Because of the extremely low level of D.-C. voltage encountered (which may be of the order of 1 microvolt), careful attention must be paid to spurious effects from a number of sources. It is, for example, common practice for physical protection and for electrostatic shielding that such devices are enclosed in hermetically sealed enclosures. A novel example of this construction and the principles upon which it is based are disclosed and claimed in my copending patent application, Ser. No. 515,373, filed June 14, 1955, now Patent No. 2,866,028, issued December 23, 1958, and assigned to the assignee of the present application. It is also common practice to provide further shielding means in the form of subsidiary enclosures of suitable materials and conformation for the purpose of effectively intercepting spurious electromagnetic energy originating outside such enclosures, preventing its impingement on the primary electrical equipment within and, if originating within, preventing impingement of such energy on associated low-level circuit components situated outside. One such form of shielding member applicable to equipment of the class discussed herein is disclosed and claimed in my further copending patent application, Ser. No. 515,305 filed June 14, 1955, now Patent No. 2,862,084, issued November 25, 1958 and also assigned to the assignee of the present application.

While the above-identified disclosures describe electrical equipments of the class under consideration which go far to meet the problems of practical applications, particularly in respect to hermetic sealing and electromagnetic shielding, the present application adds to these certain further improvements designed to eliminate undesired thermoelectric effects and to provide complete isolation of the primary apparatus from ground and thereby withstand high potentials incidental to measuring circuits to which it may be applied.

With hermetically sealed units it is commonly desired that they be capable of easy removal and replacement in the circuit. Bayonet-type terminals are therefore commonly provided. This design, however, raises a serious problem in creating conditions for the development of spurious thermoelectric voltages which may impinge on the voltages to be measured and cause significant errors therein. Commonly, in such sealed units, electrical connections are brought out of the enclosure through terminals which are sealed through glass, providing electrical insulation thereby between the terminal and the enclosure, as well as hermetic sealing. To meet the requirements of glass-to-metal sealing techniques, the terminal, or lead-in, is preferably of a nickel-alloy material, and, thus, on the inner side of the enclosure, copper wires lead to the apparatus therein, and outside, the terminal is adapted for sliding engagement with resilient spring clips, usually of Phosphor-bronze or similar material, to which permanent copper leads can be soldered to connect with the external circuit components. Thermal gradients, then, incident to practical ambient operating conditions, act as these junctions of dissimilar metals to produce electrical potentials which are significant when the exceedingly small values of the voltages being measured are considered and which make an unwanted contribution to the measuring circuits.

Furthermore, in common use the synchronous vibrator forms a part of a measuring network in which there is also a primary measuring element (such as a thermocouple) which may be immersed in a conducting fluid, such as a molten metal, which may be at a high potential above ground. The values of such potentials are far in excess of any practical spacing or insulation permitted by the small size of the sealed inverter units in common use. It is, therefore, essential to provide effective insulation of the housing and mounting external to the sealed enclosure whence the primary apparatus may be completely isolated with respect to ground and high potential gradients within the converter structure may be prevented.

The means provided for the elimination of spurious effects in my invention includes also concomitant advantages, namely, provision of a secondary enclosure which may be grounded with respect to the sealed unit, provision of a unitary structure adapted to be plugged into suitable receptacle member and retained in place by clamping means; and provision of resilient isolation members providing rigid vibration-resistant location of the sealed unit and the energizing coil within the secondary enclosure.

It is, therefore, an object of this invention to provide an hermetically sealed, plug-in electrical unit which is substantially free of thermoelectric effects.

It is a further object of this invention to provide a bayonet-type terminal and socket connector combination in which the separable electrical contact is made solely through thermoelectrically similar materials.

It is also an object of this invention to provide in precise measuring and controlling apparatus a synchronous inverter incorporating means for so connecting the synchronous inverter to the remainder of the apparatus as to substantially minimize spurious voltages, particularly such as may result from thermoelectric effects.

It is an additional object of this invention to provide an hermetically sealed electromagnetically shielded plug-in electrical unit of unitary structure which is substantially free of thermoelectric effects and in which the sealed unit is isolated from the grounded shield member.

It is a still further object of this invention to provide in precise measuring and controlling apparatus a synchronous inverter incorporating means for so connecting the synchronous inverter to the remainder of the apparatus as substantially to minimize spurious voltages, particularly such as may result from thermoelectric effects and means for isolating the inverter at a considerable potential above ground.

Further objects and advantages will be apparent from the accompanying description and the accompanying drawings of a preferred embodiment of the invention, in which—

Figure 1:
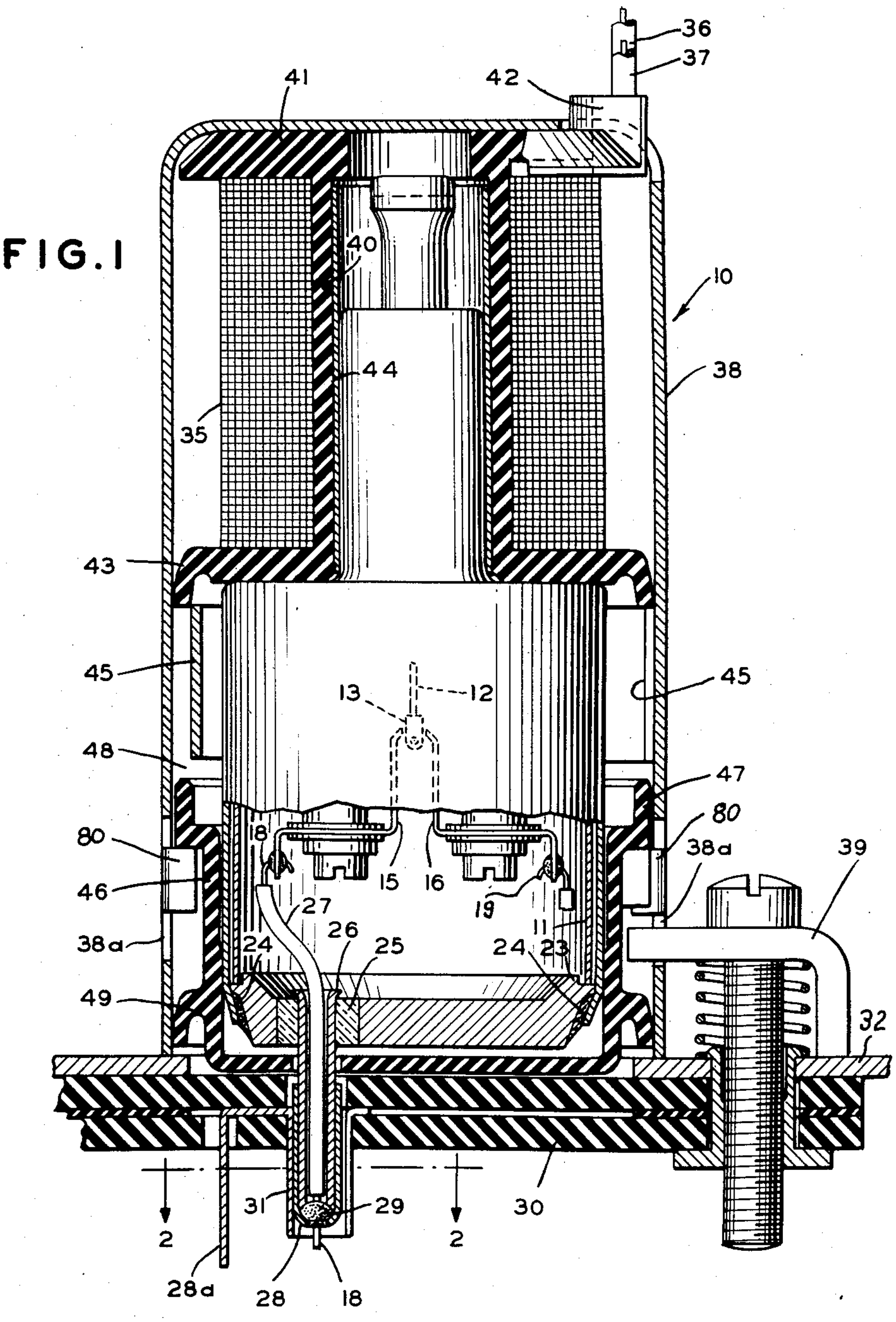
Figure 1 is an elevational view, partially in section, of an electrical unit embodying the principles of the invention.
Figure 2:
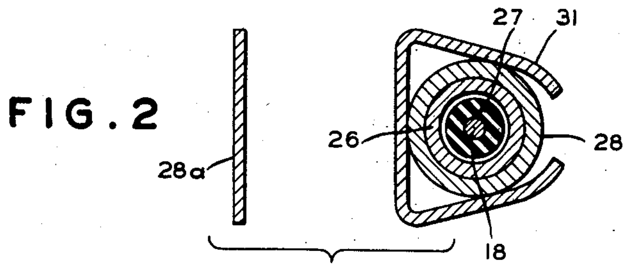
Figure 2 is a horizontal cross-sectional view along the line 2—2 of Figure 1 drawn on an enlarged scale for convenience.

It is not considered necessary to a full understanding of the present invention to repeat here the details of the structure of said synchronous inverter. As indicated diagrammatically in Figure 3, synchronous inverter 10 comprises a gas tight envelope 11 in which there is mounted an armature member 12 carrying at its free end a contact 13. Armature member 12 has a freely deflectable portion thereof extending in the air gap of a magnetic structure 14 which provides a permanent unidirectional field. The free end of armature member 12 carrying movable contact 13 extends beyond the air gap to coact, when deflected to one side or the other, with stationary contacts 15 and 16. As will be more fully pointed out, conductive leads 17, 18 and 19 are connected respectively to the contacts 13, 15 and 16, and, extend without interruption through the envelope 11 to terminals 20, 21 and 22 respectively. The lead-in and terminal structures for each of the leads 17, 18 and 19 are similar and it will be necessary, therefore, to describe only one in detail here.

Referring now to Figure 1, enclosure 11 is sealed to a base member 23, commonly of metal, at a soldered joint 24. Glass or ceramic inserts 25 are embedded in the base member and provide electrical insulation from the base for tubular terminal pins 26 with which they are likewise in sealed relation. Within the housing, each of the leads 17, 18 and 19, as shown in connection with lead 18, is surrounded by insulating sleeving 27, of a heat-resistant insulating material such as "Teflon" (a registered trademark of E. I. du Pont de Nemours and Co., Inc., designating a tetrafluoroethylene resin), which is carried within the hollow terminal to a point near the end thereof. The terminal member 26 itself is, in conventional practice, required to be of a nickel alloy suitable for making satisfactory hermetic glass-to-metal seals. On the outside of this member is fitted a closely fitting sleeve, or ferrule 28, one end of which is rolled over to form a radially inwardly extending lip providing a partial enclosure. Sleeve 28 is formed of brass or any other alloy which has negligible thermoelectric potential with respect to copper. The bare conductor 18 is of such length that it protrudes from the open terminal tube 26, and is conductively sealed by means of solder 29 with the tubular member 28, the solder penetrating into the capillary space between the inner terminal 26 and the outer sleeve 28.

The electrical unit 10 plugs into a receptacle or mounting plate 30, the ferrule member 28 making frictional engagement with a spring-clip member 31. This clip is made of a resilient material, such as Phosphor-bronze, and provides a large surface of contact with the corresponding ferrule member 28. It is commonly formed in one piece with a soldering terminal member 28a for convenience in wiring.

The portion of envelope 11 surrounding the fixed portion of armature member 12 may be of reduced cross-section to facilitate external mounting of an energizing coil 35, leads 36, 37 of which are brought out as will be described.

Enclosing the structure thus far described is an outer shell member 38. This is formed preferably of a ferromagnetic material thereby not only shielding the apparatus from the influence of possible external fields and confining internal energizing field flux from influencing exterior low-level circuits but also providing a return magnetic circuit for the alternating field produced by the coil 35 and exciting the armature member 12. One or more recesses 38a cut in the side of said shell provides access for an angle clamp 39 whereby the shell may be bolted to mounting plate 32 formed of metal and maintained at ground potential.

Within the outer shell 38, coil 35 is adapted to surround said inner envelope 11 about its portion having a reduced diameter. The coil form 40 on which the coil is wound serves the further purposes of holding the sealed inverter assembly rigidly and insulatedly in place within the outer shell. This coil form 40 is spool-shaped and formed preferably of a plastic material having good dimensional stability and some resilience. In one end 41 is molded an insulating collar 42 through which coil leads 36 and 37 may be threaded. The opposite end piece 43 is formed with a lip section slightly oversized with respect to the outer shell 38 so that, on assembly, the coil form 40 will fit snugly into the shell. The inside diameter of said coil form is adapted to accommodate the sealed inverter assembly and interposed therebetween is a thin annular lining member 44 of ferromagnetic material. This member accounts for the greater axial length of the coil 35 than the portion of armature member 12 engirdled thereby. The liner 44 will thereby improve the flux distribution between the energizing coil and the armature as well as between the armature and the outer shell.

Partially encircling the expanded section of the sealed inverter assembly and juxtaposed to the magnetic circuit elements 14, is a symmetry adjusting member 45. This is formed of a ferromagnetic material and is generally arcuate except for a flattened section at or near its midpoint. On assembly the ring member 45 fits snugly against the walls of the outer shell where it can maintain by friction any orientation desired. On assembly, if the flattened section is moved near either of the magnetic circuit members a readily variable degree of shunting of flux takes place from one or the other pole pieces and thus, any inequality in the working air gap as a result of manufacture or assembly may be compensated for.

The open end of outer shell 38 is covered by spacer-cap 46. This is a circular cup-shaped member with an offset lip 47 conformed closely with the diameter of the outer shell but providing a space 48 between shell and the inverter assembly. On the outer bottom wall of said cap is formed another lip member 49 slightly over-sized in diameter with respect to the diameter of the outer shell. Openings in the bottom of the cap provide for fitting over terminal pins of the sealed inverter assembly. The cap member is preferably of one-piece molded plastic materials having good insulating properties, dimensional stability and resiliency, such as for example, Teflon.

Figure 3:
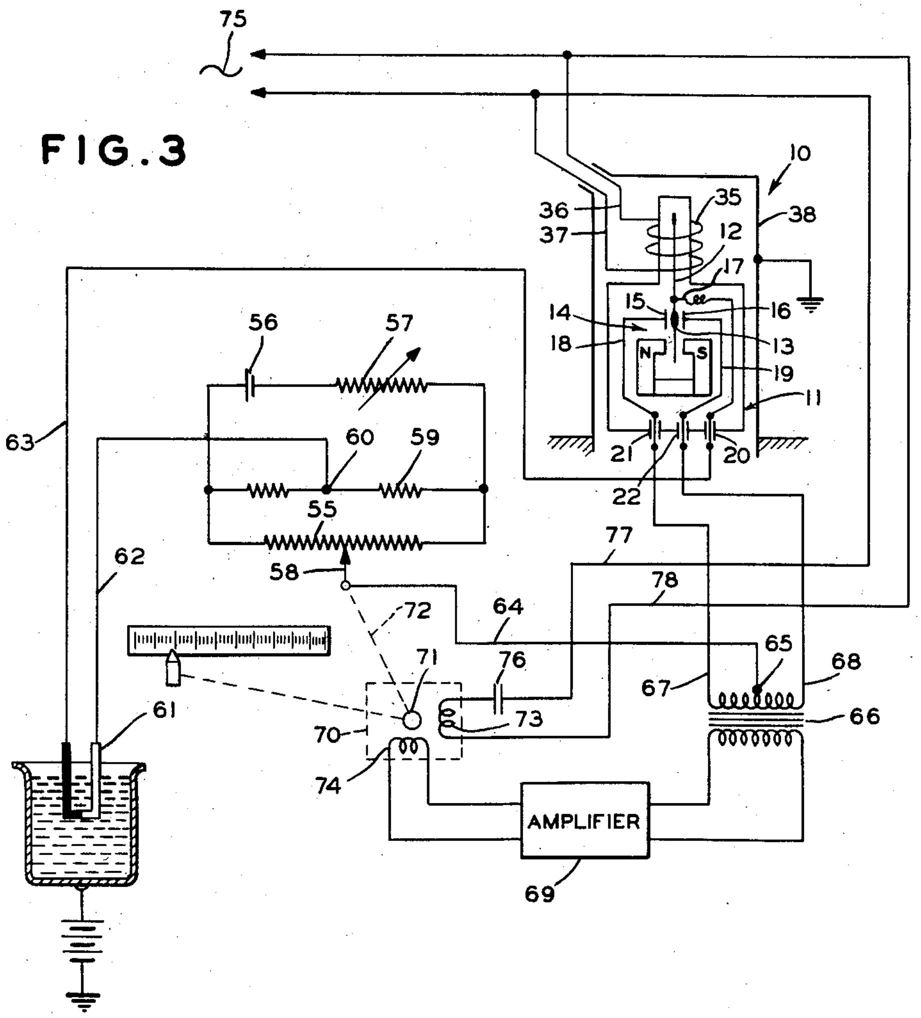
Figure 3 is a schematic view, partially diagrammatic of a self-balancing potentiometer circuit adapted for measurement of low direct current voltages and incorporating the present invention.

The components hereinbefore described are assembled as follows: The coil form 40 comprising the winding 35 is forced into the shell 38, so oriented that the coil leads 36, 37 and the protecting collar 42 register with a corresponding aperture in the closed end of the shell 38. The frictional engagement of the lip 43 holds the coil assembly firmly in place. The liner 44 is then slipped into the coil form and the symmetry-adjusting spring 45 fitted into the shell to rest against the outer edge of the coil form. Now the smaller end of the sealed inverter assembly is inserted into the coil form opening next to the liner 44 so that the enlarged end rests on the coil spool. Finally, the cap member 46 is fitted over the protruding terminals of the inverter assembly and by virtue of the oversize lip 49 in engagement with the shell, there is formed a frictional seal therebetween. By bending inwardly wing tabs 80, the internal assembly is then locked in place. The total assembly now forms a unitary synchronous inverter unit providing for many practical conditions of use in particular that of insulation from incidental high voltages above ground that may exist in the otherwise ungrounded measuring system, an example of which is illustrated in Figure 3. In the embodiment hereinbefore described and illustrated, the connections to the sealed inverter contacts are insulated from the inner enclosure but only for relatively low voltages ordinarily permitted across contacts in devices of this class. Isolation of the outer shell which may be presumed at ground potential is accomplished by the spacing afforded by the coil form and cap member which also hold the internal assembly in a rigid, vibration-free relationship.

It may be further observed that this unitary structure is adapted for simple plug-in use and by the simple locking clamp 39 may be readily fixed to mounting plate 32.

Particularly unique and advantageous results are achieved when synchronous inverter 10 is utilized in a self-balancing potentiometer circuit for the measurement of small direct current potentials as shown in Figure 3. A slide wire 55, adapted for energization from a constant potential battery or equivalent source 56 in series with an adjustable current-standardizing resistor 57, is provided with a movable contact 58 adapted to cooperate with said slide wire in selecting therealong a point having a potential suitable for balancing the associated network. In parallel with the slide wire 55 is a resistor 59 having a tapped point 60 providing one terminal to which is made connection from a source of electromotive force whose magnitude is to be measured. Said source of electromotive force may be represented by a thermocouple 61 having extension leads 62 and 63 of which the former is connected to the terminal point 60, and the latter to terminal 20 of synchronous inverter 10. In the illustrative example shown, the bare thermocouple 61 is inmersed in a liquid bath of an electrically conductive fluid which is maintained at a relatively high potential above ground potential (indicated by the source of electromotive force connected between the fluid and ground).

The contact 58 associated with the slide wire 55 is connected by means of a conductor 64 to the center-tap 65 of the primary of an isolating transformer 66. The terminals 21 and 22 of the inverter, leading from the fixed contacts 15 and 16 respectively of the inverter are connected to the primary terminals 67 and 68 of the said isolating transformer 66 whose secondary is connected to the input terminals of an amplifier 69.

An induction motor 70 is provided with a rotor 71 having mechanical connecting means 72 to the movable contact 58, whereby to position the latter with respect to the slide wire 55. Said motor is provided with two mutually displaced stator windings 73 and 74, of which the former is adapted for energization from a constant frequency alternating current source 75, and the latter is connected to the output terminals of the amplifier 69. The winding 73 may have connected in circuit therewith a capacitor 76 or other phase-shifting device, whereby, according to principles well known in the art, to obtain optimum performance of the motor. Alternatively the desired phase-shift characteristic may be introduced by suitable elements incorporated in the circuits of the amplifier 69. The coil 35 of the synchronous inverter also being connected to the source 75, operation of the movable contact 13 carried by armature 12 with fixed contacts 15 and 16 is made synchronous with excitation of the winding 73 in the motor 70.

Under a condition of balance in the potentiometer network the unidirectional potential derived from said network will have a zero value, with the result that there will be no alternating voltage applied to the transformer 66 and thereby to the winding 74 in the motor 70. The motor will consequently not be subject to any driving influence and the contact 58 will remain in its position on the slide wire 55. Assuming a change of potential in the potentiometer network, as would result from a change in the temperature to which the thermocouple 61 is exposed, the network will no longer be balanced, and unidirectional potential will be applied to the detector network including the synchronous inverter 10. Thus, the moving armature contact 13 will assume one polarity and the center-tap 65 of the transformer primary the opposite polarity. With the winding 35 energized from the source 75, the movable contact 13 coacts with the associated stationary contacts 15 and 16, to function as a reversing switch. The two halves of the primary winding of the transformer 66 being connected to said contacts 15 and 16, when the inverter is driven, D.-C. pulses flow alternatively through the half-windings toward the center-tap. If the primary is wound continuously in one direction on the transformer core, the D.-C. impulses flowing from each side toward the center set up an alternating magnetic flux which induces an alternating voltage in the secondary winding. This output voltage depends in intensity upon the magnitude of the D.-C. potential between the terminal 65 on the one hand and terminals 21 and 22 on the other. The phase position of said output with respect to the energizing current in the winding 35 depends upon the polarity of said D.-C. potential. After being suitably amplified in the amplifier 69, the output voltage will be impressed upon the winding 74 of the motor 70. Said motor will thus be caused to operate, and will translate the contact 58 along the slide wire 55. By suitably selecting, proportioning and interrelating the elements of the system, the displacement of the contact 58 may be made to have a direction and magnitude such as to reduce to zero the total unidirectional potential output of the network, thus restoring the position of balance. The position of the contact 58 with respect to the slide wire 55 thus becomes a measure of the unidirectional potential derived from the thermocouple 61.

It will readily be appreciated that not only will small unidirectional potentials, which must be dealt with, result from small changes in the temperature sensed by thermocouple 61 but also from the fact that such potentials as may be provided by the thermocouple are nulled out. Consequently, the accuracy of the apparatus is largely dependent upon its sensitivity to very small potentials such as occur as the D.-C. potentials are reduced to zero due to repositioning of movable contact 58. It is, therefore, important that the possibility of the occurrence of thermoelectric potentials be minimized if not eliminated entirely.

It is seen, therefore, in the disposition of parts and selection of materials that a readily separable connection to a sealed assembly is accomplished in which the usually interposed material of the lead-ins sealed through the enclosure is eliminated from the electrical circuit and, thus, effectively eliminating any spurious thermoelectric voltages that otherwise might result. The internal copper lead is insulatedly led to a point at which it can be joined both with an outer conductor of a thermoelectrically similar material, as well as the suitably rigid member 26 by means of which a seal is effected with the hermetic enclosure. Current then flows only along the path formed by the thermoelectrically similar materials, the soldered junctions making no significant thermoelectric contribution.

Because the tubular member 28 is of a material of good thermal conductivity compared to that of the nickel alloy commonly used for providing lead-ins adapted for sealing-in by means of glass, thermal gradients along the terminal are reduced thus further reducing the conditions for the production of undesirable thermoelectric effects.

Furthermore, effective insulation of the hermetic enclosure 11 is established so that it is only necessary to provide within the enclosure for insulation between parts with respect to potential gradients which may be readily accomplished even with the parts closely juxtaposed as they are in a miniature device of this class. The hermetic enclosure may be at a high potential above ground but is completely insulated, together with its terminals from the grounded outer shell and mounting plate.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A synchronous inverter, comprising an electrically conductive non-magnetic gas-tight envelope, an elongated armature member within said envelope and mounted for limited displacement, a plurality of contacts within said envelope one of which being movable with said armature member, magnetomotive means for cyclically displacing said armature member and including a winding, an insulative support carrying said winding and supporting the same with said winding encircling a portion of said envelope in which said armature extends, a plurality of wire conductors, one for each of said contacts and connected thereto, a plurality of metallic tubular members vitreously sealed through said envelope in mutually insulated relation, a portion of each of said tubular members extending externally of said envelope, a plurality of tubular metallic terminal members one on and encircling each of said tubular members, each of said wire conductors extending through one of said tubular members, means sealing each of said tubular members and maintaining each of said wire conductors conductively connected with a respective one of said terminal members, each of said wire conductors and the terminal member connected thereto being formed of thermoelectrically equivalent metal, a magnetic circuit member enclosing said envelope, and insulative means engirdling said envelope and spacing the same from said magnetic circuit member.

2. A synchronous inverter, comprising a gas-tight electrically conductive envelope formed with an elongated portion of reduced diameter as compared to another portion thereof, an armature member within said elongated portion and mounted for limited displacement, a contact displaceable with said armature member, magnetomotive means for cyclically displacing said armature member and comprising a winding, an insulative support carrying said winding and supporting the same with said winding encircling said elongated portion of said envelope, said insulative support having a portion of enlarged diameter as compared to the remainder thereof, a conductor connected to said contact, a metallic tubular member insulatively sealed through said envelope and forming a passageway through said envelope for said conductor, said conductor extending through said passageway, a terminal metallic member extending about at least a portion of said tubular member externally of said envelope, means sealing said conductor to said tubular member and directly conductively connecting said conductor with said terminal member, said conductor and said terminal member being formed of thermoelectrically equivalent conductive material, a magnetic circuit member enclosing said envelope, said enlarged diameter portion of said insulative support engaging the interior surface of said magnetic circuit member and spacing the same from said envelope, and an insulative cap-shaped member having at least one aperture formed therethrough and enclosing a portion of said envelope with said conductor extending through said aperture, said insulative support and said cap-shaped member extending between said magnetic circuit member and said envelope and spacing the same one from the other.

3. A synchronous inverter, comprising an electrically conductive non-magnetic gas-tight envelope, an elongated armature member within said envelope and mounted for limited displacement, a plurality of contacts within said envelope one of which being movable with said armature member, magnetomotive means for cyclically displacing said armature member and including a winding, an insulative support carrying said winding and supporting the same with said winding encircling a portion of said envelope in which said armature extends, a plurality of wire conductors, one for each of said contacts and connected thereto, a plurality of metallic tubular members vitreously sealed through said envelope in mutually insulated relation, a portion of each of said tubular members extending externally of said envelope, a plurality of tubular metallic terminal members one on and encircling each of said tubular members, each of said wire conductors extending in spaced relation through one of said tubular members, means sealing each of said tubular members and conductively connecting each of said wire conductors with a respective one of said terminal members, insulative means extending along each of said wire conductors within the tubular member associated therewith from adjacent to said conductive sealing means, each of said wire conductors and the terminal member connected thereto being formed of thermoelectrically equivalent metal, a magnetic circuit member enclosing said envelope and insulative means engirdling said envelope and spacing the same from said magnetic circuit member.

4. A synchronous inverter, comprising a gas-tight electrically conductive envelope formed with an elongated portion of reduced diameter as compared to another portion thereof, an armature member within said elongated portion and mounted for limited displacement, a contact displaceable with said armature member, magnetomotive means for cyclically displacing said armature member and comprising a winding, and insulative support carrying said winding and supporting the same with said winding encircling said elongated portion of said envelope, said insulative support having a portion of enlarged diameter as compared to the remainder thereof, a conductor connected to said contact, a metallic tubular member insulatively sealed through said envelope and forming a passageway through said envelope for said conductor, said conductor extending in spaced relation through said passageway, a terminal metallic member extending about at least a portion of said tubular member externally of said envelope, means sealing said conductor to said tubular member and directly conductively connecting said conductor with said terminal member, insulative means extending between said tubular member and said conductor from adjacent to said sealing means, said conductor and said terminal member being formed of thermoelectrically equivalent conductive material, a magnetic circuit member enclosing said envelope, said enlarged diameter portion of said insulative support engaging the interior surface of said magnetic circuit member and spacing the same from said envelope, and an insulative cap-shaped member having at least one aperture formed therethrough and enclosing a portion of said envelope with said conductor extending through said aperture, said insulative support and said cap-shaped member extending between said magnetic circuit member and said envelope and spacing the same one from the other.

5. An electrical device, comprising an enclosure member having an aperture formed therein, a metallic tubular member sealed to said enclosure member in said aperture and having a portion thereof extending externally of said enclosure member, a tubular terminal member surrounding said portion of said tubular member, a conductor extending through said tubular member and means closing said tubular member and conductively connecting said conductor with said terminal member, said conductor and said terminal member being formed of thermoelectrically equivalent metal.

6. An electrical device, comprising a conductive enclosure member having an aperture formed therein, a metallic tubular member insulatively sealed to said enclosure member in said aperture and having a portion thereof extending externally of said enclosure member, a tubular terminal member surrounding said portion of said tubular member, a conductor extending in spaced relation through said tubular member, means closing said tubular member and conductively connecting said conductor with said terminal member, said conductor and said terminal member being formed of thermoelectrically equivalent metal and an insulative sleeve engirdling said conductor and extending from adjacent to said conductive sealing means and within said tubular member.

7. An electrical device, comprising a conductive enclosure member having an aperture formed therein, a metallic tubular member insulatively sealed to said enclosure member in said aperture and having a portion thereof extending externally of said enclosure member, a tubular terminal member surrounding and engaging said portion of said tubular member, a wire conductor extending through said tubular member, and conductive sealing means closing said tubular member and conductively connecting said wire conductor with said terminal member, said wire conductor and said terminal member being formed of thermoelectrically equivalent metal.

8. An electrical device, comprising a conductive enclosure member having an aperture formed therein, a metallic tubular member insulatively sealed to said enclosure member in said aperture and having a portion thereof extending externally of said enclosure member, a tubular terminal member surrounding and engaging said portion of said tubular member, said terminal member having a portion thereof extending beyond said tubular member, a wire conductor extending through said tubular member, and conductive sealing means closing said tubular member and conductively connecting said wire conductor with said portion of said terminal member, said wire conductor and said terminal member being formed of thermoelectrically equivalent metal.

9. An electrical device, comprising a conductive enclosure member having a plurality of apertures formed therein, a plurality of metallic tubular members vitreously sealed to said enclosure member with one in each of said apertures and having a portion thereof extending externally of said enclosure member, a plurality of tubular terminal members each surrounding and engaging the external portion of a respective one of said tubular members, each of said terminal members having a portion thereof extending beyond the tubular member associated therewith, a plurality of wire conductors one extending through each of said tubular members, means closing each of said tubular members and conductively connecting each of said wire conductors with a respective one of said terminal members, and each of said wire conductors and the terminal member connected thereto being formed of thermoelectrically equivalent metal.

10. An electrical device, comprising a conductive enclosure member having a plurality of apertures formed therein, a plurality of metallic tubular members vitreously sealed to said enclosure member with one in each of said apertures and having a portion thereof extending externally of said enclosure member, a plurality of tubular terminal members each surrounding and engaging the external portion of a respective one of said tubular members, each of said terminal members having a portion thereof extending beyond the tubular member associated therewith, a plurality of wire conductors one extending in spaced relation through each of said tubular members, conductive sealing means closing each of said tubular members and conductively connecting each of said wire conductors with a respective one of said terminal members, a plurality of insulative sleeves one for each of said conductors and extending within the tubular member associated therewith from adjacent to said conductive sealing means, and each of said wire conductors and the terminal member connected thereto being formed of thermoelectrically equivalent metal.

11. A synchronous inverter comprising a gas-tight electrically conductive envelope formed with an elongated portion of reduced diameter as compared to another portion thereof, an armature member within said elongated portion and mounted for limited displacement, a plurality of contacts within said envelope at least one of which is displaceable with said armature member, leads-in insulatively sealed through said envelope and providing electrical connections for said contacts, magnetomotive means for cyclically displacing said armature member and comprising a winding, an insulative support carrying said winding and supporting the same with said winding encircling said elongated porton of said envelope, said insulative support havng a portion of enlarged diameter as compared to the remainder thereof, a ferromagnetic circuit member enclosing said envelope, said resilient portion of said enlarged diameter portion of said insulative support engaging the interior surface of said ferromagnetic member and spacing the same from said envelope, and an insulative cap-shaped member having apertures formed therethrough to receive said lead-ins, said cap-shaped member enclosing a portion of said envelope and having at least one resilient portion of enlarged diameter engaging the interior surface of said ferromagnetic member, said insulative support and said cap-shaped member extending between said ferromagnetic member and said envelope and spacing the same one from the other.

12. A synchronous inverter comprising a gas-tight electrically conductive envelope formed with an elongated portion of reduced diameter as compared to another portion thereof, an armature member within said elongated portion and mounted for limited displacement, a plurality of contacts within said envelope at least one of which is displaceable with said armature member, lead-ins insulatively sealed through said envelope and providing electrical connections for said contacts, magnetomotive means for cyclically displacing said armature member and comprising a winding, an insulative support carrying said winding and supporting the same with said winding encircling said elongated portion of said envelope, said insulative support having a resilient portion of enlarged diameter as compared to the remainder thereof, a plurality of metallic terminal members insulatively sealed through said envelope, a ferromagnetic circuit member enclosing said envelope, said resilient portion of said enlarged diameter portion of said insulative support engaging the interior surface of said ferromagnetic member and spacing the same from said envelope, said ferromagnetic member having one or more tongue portions formed in the sides thereof, and an insulative cap-shaped member having apertures formed therethrough to receive said lead-ins, said cap-shaped member enclosing a portion of said envelope and having at least one resilient portion of enlarged diameter engaging the interior surface of said ferromagnetic member, said tongue portions being bendable inwardly to engage re-entrant portions of said cap-shaped member, said insulative support and said cap-shaped member extending between said ferro-magnetic member and said envelope and spacing the same one from the other.

References Cited in the file of this patent

UNITED STATES PATENTS 2,140,792 Dressel et al. ---------- Dec. 20, 1938
2,541,223 Elliott et al. ------------ Feb. 13, 1951
2,547,026 Winkler ---------------- Apr. 3, 1951